Jan. 18, 1966 G. J. TRAYWICK 3,229,992
ADJUSTABLE LINKING MECHANISM FOR STEERABLE WHEELS
Filed Jan. 22, 1964 2 Sheets-Sheet 2
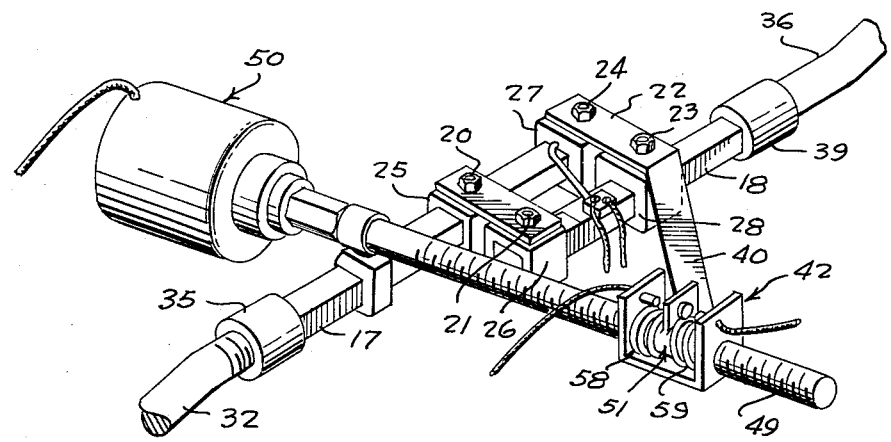
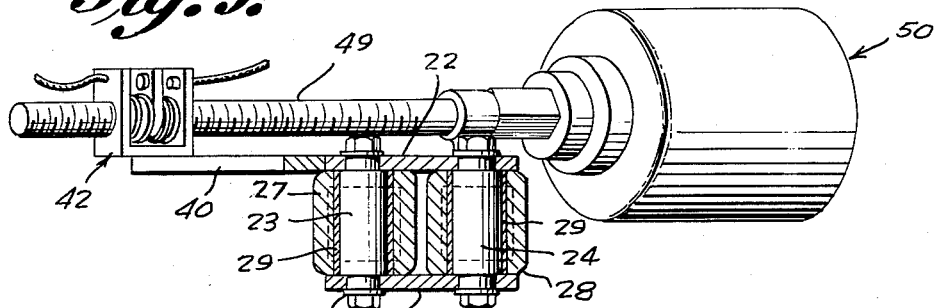
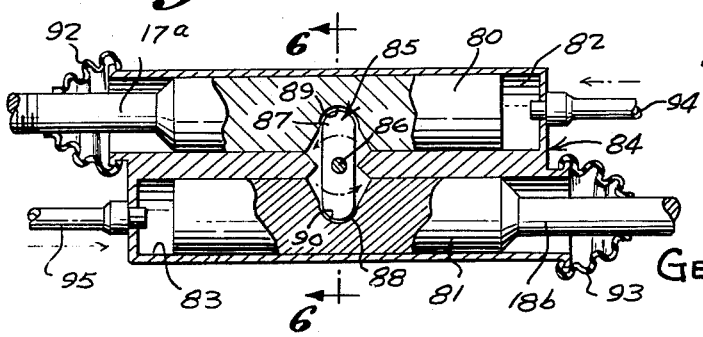
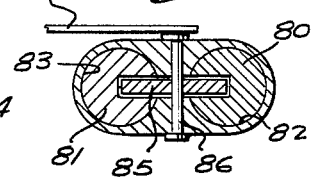
INVENTOR
GEORGE J. TRAYWICK
BY
Mason, Fenwick & Lawrence
ATTORNEY United States Patent Office 3,229,992
Patented Jan. 18, 1966

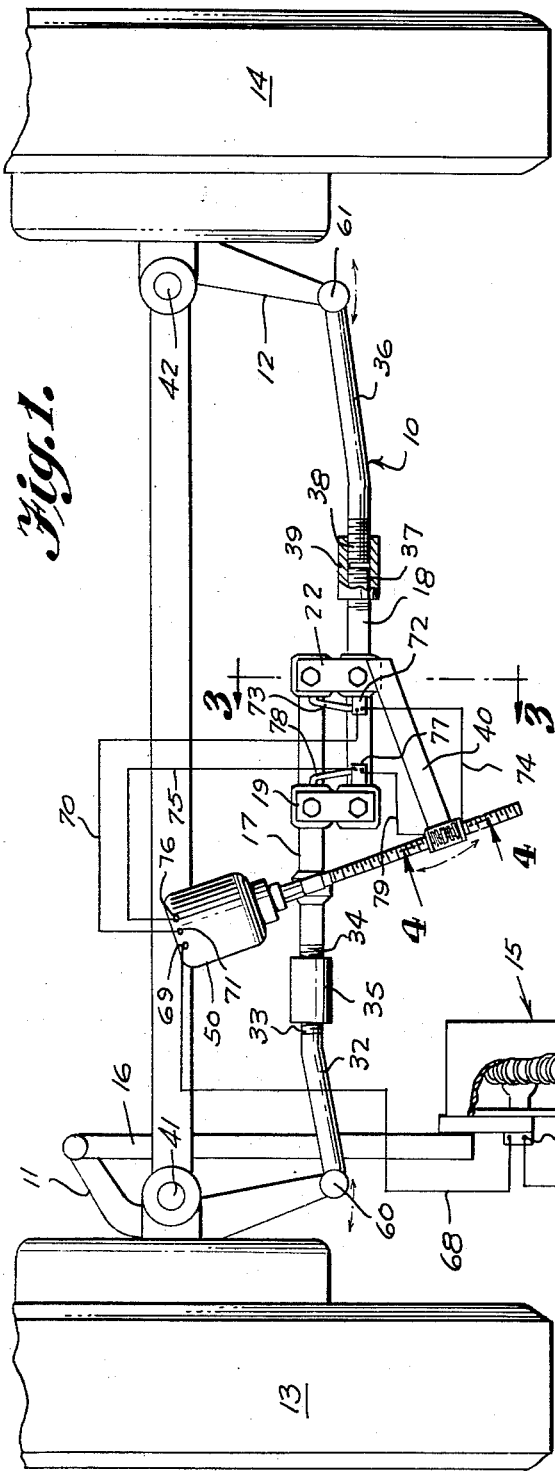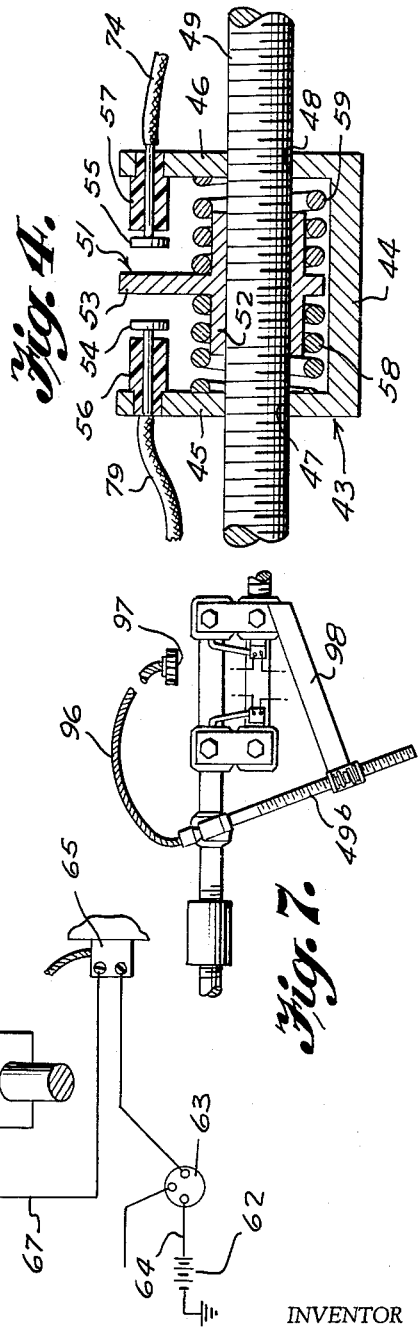

3,229,992
ADJUSTABLE LINKING MECHANISM FOR STEERABLE WHEELS
George J. Traywick, Winter Garden, Fla., assignor to Traywick Enterprises, Incorporated, Winter Garden, Fla., a corporation of Florida
Filed Jan. 22, 1964, Ser. No. 339,516
19 Claims. (Cl. 280—95)

This invention relates to a linking mechanism and more particularly to a novel linking mechanism suitable for use in a steering and control assembly of a vehicle.

In most conventional automotive vehicles, the control and steering assembly usually comprises a pair of steering arms connected to the steering wheels, a tie rod member operatively interconnecting the steering arms so that the wheels may be turned in unison, and a drag link operatively interconnecting one of the steering arms and a pitman arm connected to the steering mechanism of the vehicle, which functions to actuate the steering arms responsive to the turning of the steering control wheel. Usually, such an assembly is adapted to be adjusted and set initially so that the steering wheels will be in proper alignment. However, after a period of use, the parts of the assembly either become worn or dislocated, thus causing the wheels to become misaligned.

It further has been found that when a vehicle is moving above a certain speed and along a straight line of travel, the momentum of the steering wheels has a tendency to cause the wheels to become self aligned. When the steering and control assembly is properly adjusted, the self aligning action of the wheels has no appreciable detrimental effect on the component parts of the assembly or the operation of the vehicle. However, when the assembly is out of alignment, caused either by worn parts or the dislocation of the component parts, the misaligned wheels seeking to become aligned exert a force on the wheels and the component parts of the assembly, eventually resulting in excessive or improper wear on the wheels and improper steering of the vehicle.

Accordingly, the general object of this invention is to provide an improved steering and control assembly for a vehicle.

Another object of this invention is to provide an improved steering and control assembly for a vehicle, which is operable to permit the component parts thereof to become self aligned under certain predetermined operating conditions.

A further object of this invention is to provide an improved steering and control assembly for a vehicle, which is operable automatically to permit the component parts thereof to become self aligned upon becoming worn or dislocated.

A still further object of this invention is to provide an improved steering and control assembly for a vehicle, which is operable to permit the steering wheels to become self aligned under certain operating conditions of the vehicle.

Another object of the invention is to provide a novel linking mechanism.

A further object of this invention is to provide a novel linking mechanism for use in a conventional steering and control assembly of a vehicle.

A still further object of this invention is to provide a novel linking mechanism for use in a conventional steering and control assembly of a vehicle, which is operable to permit the component parts of the assembly and the steering wheels to become self-aligned.

Another object of this invention is to provide a novel linking mechanism adapted to operatively interconnect the steering arms of a conventional steering and control assembly of a vehicle, which is operative under predetermined operating conditions of the vehicle to permit the component parts of the assembly and the steering wheels to become self aligned and which is also operable when turning the steering wheels to transmit force for actuating the steering arms.

A further object of this invention is to provide a novel linking mechanism suitable for use in a conventional steering and control assembly of a vehicle, which has relatively few components and which is comparatively inexpensive to manufacture.

Other objects and advantages of the present invention will become obvious to those persons skilled in the art, from the following description when taken in conjunction with the accompanying drawings, wherein:

FIGURE 1 is a top plan view of an embodiment of the invention assembled in a vehicle, having portions thereof broken away;

FIGURE 2 is an enlarged perspective view of the embodiment illustrated in FIGURE 1;

FIGURE 3 is an enlarged cross-sectional view taken along line 3—3 in FIGURE 1;

FIGURE 4 is an enlarged cross-sectional view taken along line 4—4 in FIGURE 1;

FIGURE 5 is a horizontal sectional view of a portion of a second embodiment of the invention, having portions thereof broken away;

FIGURE 6 is a sectional view taken along line 6—6 in FIGURE 3; and

FIGURE 7 is a third embodiment of the invention, similar to the embodiment illustrated in FIGURES 1 through 4.

In accordance with the broad aspects of the present invention, there is provided an adjustable linking mechanism for the steering arms of the steering wheels of a vehicle suitable for permitting the wheels to become self-aligned, which generally comprises means interconnecting selected points on the steering arms, adjustable in length along a rectilinear line intersecting the selected points to permit independent displacement of the selected points relative to each other along the line intersecting the points, means operatively connected to the interconnecting means for restricting the adjustment thereof to limit displacement of each of the selected points within predetermined limits and means operatively connected to the restricting means for selectively displacing the predetermined limits.

Referring to FIGURE 1 of the drawings, there is shown a top plan view of a first embodiment of the invention illustrating a linking mechanism 10, which operatively interconnects a pair of steering arms 11 and 12 of the steering wheels 13 and 14, respectively. The steering arm 11 is operatively connected in the conventional manner to a steering mechanism 15 of the vehicle by means of a drag link 16. The linking mechanism 10 generally comprises a pair of linking members 17 and 18, which are hingedly connected together for displacement longitudinally relative to each other by means of a first pair of rigid hinge plates 19, 19 pivotally connected to linking members 17 and 18 by means of a pair of hinge pins 20 and 21, and a second pair of rigid hinge plates 22, 22 which are pivotally connected to the linking members 17 and 18 by a pair of hinge pins 23 and 24. As best illustrated in FIGURES 2 and 3, the hinge plates 19, 19 are maintained in spaced parallel relation by means of spacer members 25 and 26, which are mounted on the linking members 17 and 18 and which preferably consist of a hard rubber material. The rigid hinge plates 22, 22 are maintained in spaced parallel relation by means of a pair of similar spacer members 27 and 28, which also are mounted on the linking members 17 and 18. Each of the hinge pins 20, 21, 23 and 24 also is provided with a spacer sleeve 29 preferably consisting of a rigid metal material. The pins are threaded at the ends thereof for receiving a washer 30 and a nut 31 to provide a suitable clamping force on the hinge plates, thereby permitting adjustment of the freedom of movement of the linking members 17 and 18 relative to each other.

The linking member 17 is adapted to be connected to the steering arm 11 by means of a tie rod section 32. The linking member 17 and the tie rod section 32 each are provided with threaded end portions 33 and 34, respectively, which are received in a threaded coupling member 35. The threaded portions 33 and 34 may be threaded to provide righthand and lefthand threads so that the length of the connection can be adjusted by simply rotating the coupling member 35. Similarly, the linking member 18 is connected to the steering arm 12 by means of a tie rod section 36. The ends of the linking member 18 and the tie rod section 36 also are threaded, as at 37 and 38, and are received within the threaded coupling member 39. The threaded portions 37 and 38 also can be threaded to provide righthand and lefthand threads, thereby permitting adjustment of the length of the connection by rotating the coupling member 39.

Formed integral with the upper hinge plate 22 is an arm member 40, which with the upper hinge plate 22, defines a lever member displaceable about the axis of hinge pin 23. The arm member 40 of the lever member is displaceable responsive to longitudinal displacements of the linking members 17 and 18 relative to each other, caused by the pivotal movement of the steering arms 11 and 12 about the pivot axes 41 and 42, respectively.

As best illustrated in FIGURES 2 through 4, the free end of the arm member 40 is provided with a housing member 43 comprising a bottom wall 44 and a pair of spaced end walls 45 and 46. The end walls 45 and 46 are provided with a pair of aligned openings 47 and 48, respectively, which are adapted to receive a threaded rod or screw member 49, therethrough. The screw member 49 is pivotally mounted on the linking member 17, and is provided with an electrical motor 50 for rotating the screw member. As best shown in FIGURE 4, there is provided a traveller member 51 disposed within the housing member 42, having an internally threaded cylindrical portion 52 threadedly mounted on the screw member 49, and an upstanding abutment 53, which is engageable with a pair of opposed electrical contact elements 54 and 55 mounted on the end walls 45 and 46 and insulated therefrom by means of suitable insulating elements 56 and 57, when the end walls 45 and 46 are moved axially relative to the screw member 49. The end walls 45 and 46 of the housing member are urged in a centering position relative to the upstanding abutment 53 of the traveller member by means of a pair of springs 58 and 59 disposed between the upstanding abutment 53 and the end walls 45 and 46.

It will be appreciated from the construction illustrated in FIGURE 4 that the displacement of the arm member 40 of the lever member is limited by the contact of either of the electrical contact elements 54 and 55 with the upstanding abutment 53 of the traveller member threadedly mounted on the screw member 49. Correspondingly, the relative longitudinal displacement of the linking members 17 and 18 is limited within predetermined limits defined by the spacing between one of the end walls 45 and 46 and the upstanding abutment 53. Also, the points 60 and 61 defining the axes of the pivotal connection bewteen the tie rod section 32 and the steering arm 11, and the pivotal connection between the tie rod section 36 and steering arm member 12, are displaceable along a line intersecting such points within the same predetermined limits, similarly defined by the spacing between one of the end walls 45 and 46 and the upstanding abutment 53. It further will be appreciated that such predetermined limits may be displaced by rotating the screw member 49 to displace the traveller member 51 axially relative to the screw member 49.

The electrical motor 50 may be of any suitable type which will selectively drive the screw member 49 in forward or reverse directions, so that the traveller member 51 can be moved axially relative to the screw member 49 in either direction. The electrical control system for the linking mechanism generally comprises an electric battery 62, an ignition switch 63, an electrical lead line 64 interconnecting the battery and the ignition switch, a speed responsive switch 65 which is adapted to open when the speed of the vehicle is reduced below a predetermined speed, preferably twenty miles per hour, a switch 66 operatively connected to the steering mechanism 15 which is adapted to open when the wheels have been turned beyond a predetermined angle, preferably 10°, an electrical lead line 67 interconnecting the speed responsive switch 65 and the wheel angle responsive switch 66 and an electrical lead line 68 interconnecting the wheel angle responsive switch 66 and a terminal 69 of the electrical motor 50. The current supply circuit of the electrical motor 50 is completed by an electrical lead line 70, which interconnects a forward drive terminal 71 of the motor and a ten degree micron switch 72 mounted on the linking member 18, having an actuating arm portion 73 engageable with the spacer member 27 for opening the circuit when the hinge plate members 22 are deviated beyond a predetermined angle relative to the axis of hinge pin 23, and an electrical lead line 74 interconnecting the switch 72 and the electrical contact element 55 mounted on the housing member 42. The electrical supply circuit for the motor 50 also can be completed through electrical lead line 75 interconnecting the reverse drive terminal 76 provided on the motor 50 and a ten degree micron switch 77 mounted on the linking member 18, having an actuating arm portion 78 engageable with the spacer member 25 for opening the circuit when the hinge plates 19 deviate beyond a predetermined angle relative to the axis of the hinge pin member 21 and an electrical lead line 79 interconnecting the switch 77 and the electrical contact element 54 mounted on the housing member 42. It will be appreciated that with the limit switches 72 and 77 closed, the forward drive and reverse drive circuits of the motor 50 are closed when the upstanding abutment 53 of the traveller member 51 consisting of a current conducting material, engages either of the electrical contact elements 54 or 55, thereby providing a ground for either circuit.

In operation, whenever the vehicle is moving along a substantially straight line of travel, at a speed above 20 m.p.h., the linking members have a sufficient amount of independent freedom of movement to permit each of the steering wheels to become self aligned. The longitudinal displacement of the linking members 17 and 18 relative to each other permits the points 60 and 61 on the steering arms 11 and 12 to be displaced relative to each other along a rectilinear line intersecting such points. Each of these points can be displaced relative to the other independently within a predetermined range determined by the spacing between the contact members 54 and 55 and the upstanding abutment 53 of the traveller member 51. During the operation of the vehicle, however, when the wheels happen to become misaligned appreciably, and the wheels react to force the steering arms and the points 60 and 61 to assume positions beyond the predetermined limits defined by the spacing between the upstanding abutment in the traveller member 51 and the electrical contact elements 54 and 55, either a compressive or tensile force is applied to the linking mmebers 17 and 18 to cause the lever member to pivot and the arm member 40 thereof to become displaced relative to the upstanding abutment on the traveller member 51. Accordingly, one of the electrical contact elements 54 and 55 will make an electrical contact with the upstanding abutment of the traveller member 51 to complete supply circuits of the motor 51 to drive the screw member 49 either in the forward or reverse direction to displace the traveller member 51 axially relative to the screw member 49, away from the engaging contact. The upstanding abutment portion of the traveller member 51 then has a tendency in cooperation with the spring members 58 and 59 to become centered relative to the opposed electrical contact elements 54 and 55 and the spaced end walls 45 and 46. The displacement of the traveller member thereby permits the arm member 40 of the lever member to assume a new position responsive to the forces applied to the wheels during the self alignment operation, relieving either the compressive or tensile forces applied to the linking members 17 and 18.

The speed responsive switch 65 is adapted to deenergize either of the supply circuits for the electric motor 50 when the speed of the vehicle is below 20 m.p.h. and the switch 66 operates to open either of the supply circuits for the electric motor 50 when the angle of the wheels exceeds 10° whereby the arm portion 40 of the lever member is prevented from being displaced beyond predetermined limits and motion may be transmitted from point 60 to point 61 on the steering arms so that the wheels may be turned in unison. In addition, the switching members 72 and 76 serve to open the supply circuits for the electric motor 50 whenever the linkage members 17 and 18 are displaced between a predetermined limit. It thus will be noted that the linking mechanism 10 provides a rigid linking means between the points 60 and 61 on the steering arms operable to permit the wheels to be steered in unison, and yet provides an adjustable linking means which is operable to permit the points 60 and 61 to be displaced independently relative to each other along a rectilinear line intersecting such points within predetermined limits, also permitting the predetermined limits to be displaced along the line intersecting such points responsive to reactive forces developed by the wheels when they have become apreciably misaligned.

Referring to FIGURES 5 and 6 of the drawings, there is shown a fragmentary view of a second embodiment of the invention which is similar to the embodiment illustrated in FIGURES 1 through 4. This embodiment differs from the aforementioned embodiment with regard to the operative connection between the linking members. As illustrated in FIGURE 5, linking members 17a and 18b are provided with piston portions 80 and 81, having parallel axes which are received in cylindrical chambers 82 and 83 of a housing member 84. The piston portions 80 and 81 of the linking members are operatively connected for coordinated movement by means of a dog member 85, which is pivotally connected to the housing 84 by means of a pin member 86. The dog member 85 is adapted to pivot in a plane passing through the axes of the cylindrical portions 80 and 81, and is provided with rounded end portions 87 and 88 which are received in suitably configured recesses 89 and 90 in the piston portions 80 and 81, respectively. Rigidly secured to the upper end of the pivot pin 86 is an arm member 91 which functions in a manner similar to the arm member 40 of the lever member described in connection with the first mentioned embodiment. In this embodiment the chambers 82 and 83 can be suitably sealed by means of flexible members 92 and 93 and provided with fluid lines 94 and 95 which may function in different manners, including providing a means for determining the pressure variations of a fluid disposed in the chambers and possibly supplying fluid to the chambers to selectively displace the piston portions of the linking members.

The embodiment disclosed in FIGURE 7 also is similar to the first mentioned embodiment, differing in the respect that there is provided a manual means for driving the screw member 49b. In lieu of an electric motor which is selectively energized to drive the screw member in different directions, the screw member 49b is provided with a flexible cable 96, having a turning knob member 97 mounted on the end thereof. The turning knob 97 can be mounted at a convenient location within the vehicle and can be utilized to rotate the screw member 49b to axially displace the traveller member as described in connection with the first mentioned embodiment. An electrical indicator system can be provided to indicate to the operator when the arm member 98 has been appreciably displaced so that the knob 97 can be turned to rotate the screw member and displace the traveller member.

From the foregoing detailed description it will be evident that there are a number of changes, adaptations and modifications of the present invention which come within the province of those skilled in the art. However, it is intended that all such variations not departing from the spirit of the invention be considered as within the scope thereof as limited solely by the appended claims.

What I claim is:

1. An adjustable linking mechanism for the steering arms of the steering wheels of a vehicle suitable for permitting the wheels to become self aligned comprising first and second linking means operatively connectible to said steering arms and hingedly connected to each other for displacement relative to each other to permit independent displacement of selected points on said steering arms along a rectilinear line intersecting said points, lever means operatively connected to said linking means displaceable corresponding to the relative displacement of said linking means, means for restricting the displacement of said lever means to limit the displacement of said points within predetermined limits and means for displacing said restricting means thereby selectively displacing said predetermined limits.

2. An adjustable linking mechanism for the steering arms of the steering wheels of a vehicle suitable for permitting the wheels to become self aligned comprising first and second linking members operatively connectible to said steering arms and hingely conected to each other for displacement relative to each other to permit independent displacement of selected points on said steering arms along a rectilinear line intersecting said points, a lever member pivotally mounted on said first linking member having a first arm portion thereof pivotally secured to said second linking member, means for restricting the displacement of the second arm portion of said lever member to limit the displacement of said linking members and correspondingly the displacement of said selected points within predetermined limits and means for displacing said restricting means thereby selectively displacing said predetermined limits.

3. An adjustable linking mechanism for the steering arms of the steering wheels of a vehicle suitable for permitting the wheels to become self aligned comprising first and second linking members operatively connectible to said steering arms and hingedly connected to each other for displacement relative to each other to permit displacement of selected points on said steering arms along a rectilinear line intersecting said points, a lever member pivotally mounted on said first linking member having a first arm portion thereof pivotally secured to said second linking member, limit means mounted on said mechanism, the second arm portion of said lever member having means engageable with said limit means for restricting the displacement of the second arm portion of said lever member to limit the displacement of said linking members and correspondingly the displacement of said electrical points within predetermined limits and means for displacing said limit means thereby selectively displacing said predetermined limits.

4. An adjustable linking mechanism according to claim 3, wherein there is provided means responsive to predetermined displacements of said linking members for selectively operating said displacing means.

5. An adjustable linking mechanism for the steering arms of the steering wheels of a vehicle suitable for permitting the wheels to become self aligned comprising first and second linking members operatively connectible to said steering arms and hingedly connected to each other for displacement relative to each other to permit displacement of selected points of said steering arms along a rectilinear line intersecting said points, a lever member pivotally mounted on said first linking member having a first arm portion thereof pivotally secured to said second linking member, the second arm portion of said lever member having a pair of spaced abutments defining the displacement limits of said linkage members and correspondingly the limits of said selected points, a rotatable member mounted on said second linking member having a threaded end portion, a traveller member mounted on the threaded portion of said rotatable member having abutments disposed between and engageable with the abutments of said second arm portion of said lever member and means for selectively driving said rotatable member to displace said traveller member axially relative to said rotatable member.

6. An adjustable linking mechanism according to claim 5, wherein there is provided means responsive to predetermined displacements of said linking members for selectively driving said rotatable member.

7. An adjustable linking mechanism according to claim 5, including electrical means for driving said rotatable member in first and second directions, a first electrical supply circuit for energizing said electrical means for driving said rotatable member in said first direction, a second electrical supply circuit for energizing said electrical means to drive said rotatable member in said second direction and said electrical supply circuits having switching means responsive to predetermined displacements of said lever member to selectively close said electrical supply circuits.

8. An adjustable linking mechanism according to claim 7, wherein the electrical supply circuits are provided with circuit breaker means for breaking the supply circuits when the linking members have been displaced beyond predetermined limits.

9. An adjustable linking mechanism according to claim 7, wherein the electrical supply circuits are provided with circuit breaker means responsive to the angular deviation of the steering wheels beyond a predetermined angle for breaking the electrical supply circuits.

10. An adjustable linking mechanism according to claim 7, wherein the electrical supply circuits are provided with a circuit breaker means responsive to the speed of the vehicle for breaking the electrical supply circuits when the speed of the vehicle is below a predeterimned speed.

11. An adjustable linking mechanism for the steering arms of the steering wheels of a vehicle suitable for permitting the wheels to become self aligned comprising first and second linking members operatively connectible to said steering arms and hingedly connected together for displacement relative to each other to permit displacement of selected points of said steering arms along a rectilinear line intersecting said points, a lever member pivotally mounted on said first linking member having a first arm portion thereof pivotally secured to said second linking member, the second arm portion of said lever member having a pair of spaced abutments defining the displacement limits of said linking members and correspondingly the displacement limits of said selected points, a rotatable member pivotally mounted on said second linking member having a threaded end portion extending through aligned openings in the spaced abutments on the second arm portion of said lever member, a traveller member mounted on the threaded portion of said rotatable member disposed between said spaced abutments, biasing means interposed between said traveller member and said spaced abutments urging said spaced abutments into a centering position relative to said traveller member and means for selectively driving said rotatable member to displace said traveller member axially relative to said rotatable member.

12. An adjustable linking mechanism according to claim 11, wherein there is provided means responsive to predetermined displacements of said linking members for selectively driving said rotatable member.

13. An adjustable linking mechanism for the steering arms of the steering wheels of a vehicle suitable for permitting the wheels to become self aligned comprising adjustable means interconnecting selected points on said steering arms to permit independent displacement of said points relative to each other, means operatively connected to said interconnecting means for restricting the adjustment of said interconnecting means to limit displacement of each of said points within predetermined limits, means operatively connected to said restricting means for selectively displacing said predetermined means and means responsive to a predetermined displacement of said interconnecting means for selectively actuating said displacement means.

14. An adjustable linking mechanism for the steering arms of the steering wheels of a vehicle suitable for permitting the wheels to become self aligned comprising means interconnecting selected points on said steering arms adjustable in length along a rectilinear line intersecting said points to permit independent displacement of said points relative to each other along said line, means operatively connected to said interconnecting means for restricting the adjustment of said interconnecting means to limit displacement of each of said points within predetermined limits, means operatively connected to said restricting means for selectively displacing said predetermined limits and means responsive to predetermined displacements of said interconnecting means for selectively operating said displacing means.

15. An adjustable linking mechanism for the steering arms of the steering wheels of a vehicle suitable for permitting the wheels to become self aligned comprising first and second linking means connectible to said steering arms and operatively connected together for displacement relative to each other to permit independent displacement of selected points on said steering arms along a rectilinear line intersecting said points, means operatively connected to said first and second linking members for restricting the displacement of said linking means to limit displacement of said points within predetermined limits, means operatively connected to said restricting means for selectively displacing said predetermined limits and means responsive to predetermined displacements of said linking means for selectively operating said displacing means.

16. An adjustable linking mechanism for the steering arms of the steering wheels of a vehicle suitable for permitting the wheels to become self aligned comprising first and second linking means operatively connectible to said steering arms and hingedly connected together for displacement relative to each other to permit independent displacement of selected points on said steering arms along a rectilinear line intersecting said points, means operatively connected to said first and second linking means for restricting the displacement of said linking means to limit displacement of said selected points within predetermined limits, means operatively connected to said restricting means for selectively displacing said predetermined limits and means responsive to predetermined displacements of said linking members for selectively operating said displacing means.

17. An adjustable linking mechanism for the steering arms of the steering wheels of a vehicle suitable for permitting the wheels to become self aligned comprising first and second linking means operatively connectible to said steering arms and hingedly connected to each other for displacement relative to each other to permit independent displacement of selected points on said steering arms along a rectilinear line intersecting said points, lever means operatively connected to said linking means displaceable corresponding to the relative displacement of said linking means, means for restricting the displacement of said lever means to limit the displacement of said points within predetermined limits, means for displacing said restricting means thereby selectively displacing said predetermined limits and means responsive to predetermined displacements of said linking means for selectively operating said displacing means.

18. An adjustable linking mechanism for the steering arms of the steering wheels of a vehicle suitable for permitting the wheels to become self aligned comprising first and second linking members operatively connectable to said steering arms and hingedly connected to each other for displacement relative to each other to permit independent displacement of selected points on said steering arms along a rectilinear line intersecting said points, a lever member pivotally mounted on said first linking member having a first arm portion thereof pivotally secured to said second linking member, means for restricting the displacement of the second arm portion of said lever member to limit the displacement of said linking members and correspondingly the displacement of said selected points within predetermined limits, means for displacing said restricting means thereby selectively displacing said predetermined limits and means responsive to predetermined displacements of said linking members for selectively operating said displacing means.

19. An adjustable linking mechanism for the steering arms of the steering wheels of a vehicle suitable for permitting the wheels to become self aligned comprising first and second linking members operatively connectible to said steering arms hingedly connected together for displacement relative to each other to permit displacement of selected points of said steering arms along a rectilinear line intersecting said points, a lever member pivotally mounted on said first linking member having a first arm portion thereof pivotally secured to said second linking member, a second arm portion of said lever member having a pair of spaced abutments defining displacement limits of said linking members and correspondingly the displacement limits of said selected points, said spaced abutments having opposed electrical contact elements mounted thereon, a rotatable member pivotally mounted on said second linking member having a threaded end portion extending through aligned openings on said spaced abutments, a traveller member consisting of an electrically conducting material mounted on the threaded portion of said rotatable member disposed between said spaced abutments having an abutment engageable with said electrical contact elements, biasing means interposed between said traveller member and said spaced abutments urging said spaced abutments into a centering position relative to said traveller member, an electrical motor having terminal connections for forward and reverse drive for driving said rotatable member, a first electrical supply circuit connected in series with the forward drive terminal of said electrical motor and a first electrical contact mounted on said spaced abutments, a second supply circuit connected in series with the reverse terminal contact of said electrical motor and the second electrical contact element of said spaced abutments, said electrical supply circuits having first circuit breaker means for breaking the supply circuits when the linking members have been displaced beyond predetermined limits, second circuit breaker means responsive to the angular deviation of the steering wheels beyond a predetermined angle for breaking the electrical supply circuits and a third circuit breaker means responsive to the speed of the vehicle for breaking the supply circuit when the speed of the vehicle is below a predetermined speed.

References Cited by the Examiner
UNITED STATES PATENTS

| | | | |
|---|---|---|---|
| 1,949,585 | 3/1934 | Smeltz et al. | 280—95 |
| 2,557,936 | 6/1951 | Brown | 180—79.2 |
| 2,592,475 | 4/1952 | Seely | 280—443 |
| 2,878,030 | 3/1959 | Couch | 280—95 |
| 3,087,564 | 4/1963 | Quayle | 180—79.2 |
| 3,148,744 | 9/1964 | De Stasi | 180—79.2 |

BENJAMIN HERSH, *Primary Examiner.*

KENNETH H. BETTS, *Examiner.*